No. 773,251. Patented October 25, 1904.

UNITED STATES PATENT OFFICE.

EMIL FISCHER, OF BERLIN, AND JOSEF VON MERING, OF HALLE-ON-THE-SAALE, GERMANY, ASSIGNORS TO THE FIRM OF E. MERCK, OF DARMSTADT, GERMANY.

UREIDE OF DIALKYL-ACETIC ACID AND PROCESS OF MAKING SAME.

SPECIFICATION forming part of Letters Patent No. 773,251, dated October 25, 1904.

Application filed March 9, 1903. Serial No. 146,855. (Specimens.)

*To all whom it may concern:*

Be it known that we, EMIL FISCHER, residing at Hessischestrasse 2, Berlin, and JOSEF VON MERING, residing at Halle-on-the-Saale, Germany, subjects of the German Emperor, have invented certain new and useful Improvements in Ureides of Dialkyl-Acetic Acids and Processes for the Preparation of Such, of which the following is a clear, full, and exact description.

The subject of this invention is a group of hitherto unknown chemical compounds—to wit, ureides of dialkyl acetic acids, also called " dialkyl-acetyl ureas "—and a process for preparing such compounds.

Malonic acid may be combined with urea by the action of phosphorus oxychlorid, so as to form barbituric acid. (Grimaux, *Bulletin Soc. Chim. de Paris*, 31, 146.) The same process is applicable to the therein so-called "dimethyl-malonic" acid. (Thorne, *Journal of the Chemical Society*, 39, 545.) Experiments made by us have shown that when operating under similar conditions with those derivatives of malonic acid which contain two ethyls, two propyls, or other (like or unlike) alkyls rich in carbon the formation of a barbituric acid does not take place at all or only in a very imperfect degree and that a different action takes place, which results in the formation of hitherto unknown ureides of dialkyl-acetic acids—that is, dialkyl acetyl ureas—which new compounds possess considerable medicinal value on account of their hypnotic properties. The process is represented by the following equation, (in which "Alk$_2$" represents two like or two unlike alkyl molecules:)

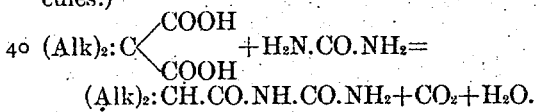

$(Alk)_2:CH.CO.NH.CO.NH_2 + CO_2 + H_2O.$

The process shown in this particular example consists in condensing a dialkyl-malonic acid with urea, so as to split off both carbon dioxid and water. The remainder is the dialkyl-acetyl urea thus newly formed. This operation can be performed in one step, as above stated and shown, or it can be done in two successive steps, as will be shown further below.

*Examples of Condensation in One Step.*

NOTE.—The word " parts," hereinafter used to denote proportions in which ingredients or components are mixed or employed, is throughout understood to mean "parts by weight."

1. *Diethyl-acetyl urea.*—To prepare this new compound, the reaction may be brought about under experimental conditions similar to those devised by Thorne for the preparation of dimethyl - barbituric acid. When thirty-two parts of diethyl-malonic acid are carefully mixed with thirty-two parts of urea and 25.6 parts of phosphorus oxychlorid are added to the mixture, an energetic reaction takes place with effervescence. When that has ceased, heat is applied for several hours on the water-bath. The mass after cooling is extracted with a small quantity of cold water, which leaves undissolved the new product, which is collected on a filter and crystallized from hot water. Its composition is $C_7H_{14}N_2O_2$, and it melts at 207.5° centigrade, (corr.) It dissolves in about one hundred and twenty parts of hot water and crystallizes in the form of fine needles. In hot alcohol it is much more freely soluble. Its composition is demonstrated by its reaction with concentrated hydrochloric acid at 100° centigrade, when it yields urea and diethyl-acetic acid. In carrying out the process indicated above the needed proportion of phosphorus oxychlorid may be considerably reduced by first mixing carefully fifty parts of diethyl-malonic acid and 18.6 parts of urea, preferably by melting them together under diminished pressure at about 110° centigrade. The whole is then cooled down to about 85° centigrade, and sixteen parts of phosphorus oxychlorid are added in successive portions, the mixture meanwhile being well stirred. It is then heated for about an hour on the water-bath. The resulting mass when cold is treated with cold water, and the undissolved residue is then boiled with alcohol, which leaves undissolved only a comparatively small portion thereof, whereupon the diethyl-acetyl urea contained in the alcoholic solution is allowed spontaneously to deposit by cooling. A pure preparation is obtained by redissolving in hot water. The phosphorus oxychlorid used in this process may be replaced by phosphorus trichlorid, phosphorus pentachlorid, thionyl chlorid, sulfuryl chlorid, acetyl chlorid, chlorsulfonic acid, or other acid chlorids acting in like manner.

2. *Dipropyl-acetyl urea.*—When in the process described in Example 1 the diethyl-malonic acid is replaced by the molecularly equivalent quantity of dipropyl-malonic acid, analogous results are obtained. The product is, however, so sparingly soluble in water as to require recrystallization from hot alcohol. Its composition is represented by the formula: $C_9H_{18}N_2O_2$. It melts at 192.5° centigrade (corr.) and crystallizes from the alcoholic solution in fine colorless needles. It requires about five hundred parts of hot water for complete solution.

3. *Methyl-ethyl-acetyl urea.*—When to a mixture of twenty parts of powdered methyl-ethyl-malonic acid and twenty parts of powdered urea sixteen parts of phosphorus oxychlorid are added and after the reaction has subsided the mass is heated for eight to ten hours on the water-bath, then extracted with a little cold water, and the residue boiled with about twenty-five times its bulk of water, the methyl-ethyl-acetyl urea passes into solution and is deposited, as the solution cools, in the form of colorless needles melting at 178.5° centigrade, (corr.) It dissolves in about twenty-six parts of hot water, and its composition is represented by the formula: $C_6H_{12}N_2O_2$.

*Examples of Condensation in Two Steps.*

The above-described process, while conserving its essential character, may, as stated, be varied in detail by performing it in two steps. The formation of dialkyl-acetyl ureas from the corresponding dialkyl-malonic acids may be effected in two stages in such a way that in the first stage dialkyl-malonic acid and urea are made to combine under elimination of one molecule of water in accordance with the equation

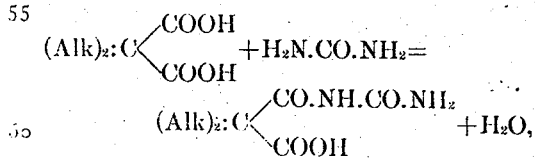

and in the second stage the ureido-dialkyl-malonic acid so formed is split up into carbonic acid and the corresponding dialkyl-acetyl urea. This is effected by the use of fuming sulfuric acid as a condensing agent.

4. *Diethyl-acetyl urea.*—A carefully-prepared mixture of two parts of diethyl-malonic acid and one part of urea is added to four parts of fuming sulfuric acid containing seventy per cent. of anhydrid, thoroughly cooled by a freezing mixture of salt and ice. If on removal of the freezing mixture the thick pasty mass under reaction becomes hot, this heating must be moderated by again applying cooling agents. Otherwise a very violent reaction might take place, resulting in the charring of the organic substance. When this spontaneous heating ceases to be noticeable, the mass is heated on the water-bath for a short period, during which some bubbles of gas are evolved. The cooled viscous mass is afterward poured into five times its weight of cold water. The crystalline mass resulting hereon is separated by filtration and redissolved in hot water. In this way fine lustrous flakes of ureido-diethyl-malonic acid are obtained, which are freely soluble in alkalis, but very sparingly so in cold water. At 162° centigrade this acid begins to be converted into diethyl-acetyl urea, with violent evolution of carbonic acid. In order to obtain pure diethyl-acetyl urea, all that is requisite is to recrystallize from hot water the solid residue obtained by heating the ureido-diethyl-malonic acid to 165° to 170° centigrade.

5. *Dipropyl-acetyl urea.*—In case dipropyl-malonic acid be used in the place of the diethyl-malonic acid of the foregoing example the reaction takes, on the whole, a similar turn. In this case the intermediate product of the first step is always a mixture of dipropyl-acetyl urea and ureido-dipropyl-malonic acid. On treating such intermediate product, however, with dilute alkaline solutions the ureido-dipropyl-malonic acid goes into solution, from which it may by the addition of acids be precipitated in the form of a white crystalline mass. The latter has the composition corresponding to $C_{10}H_{18}O_4N_2$ and melts at a temperature of 146° centigrade, at the same time giving off carbon dioxid and being transformed into dipropyl-acetyl urea. Dimethyl-malonic acid treated by the above steps reacts in a manner different from that of diethyl and dipropyl malonic acids. On its being mixed with urea and acted on by fuming sulfuric acid dimethyl-barbituric acid is formed.

It will be observed that each of the ureides claimed herein answers to the general formula $(Alk)_2CH.CO.NH.CO.NH_2$, in which $(Alk)_2$ represents two alkyls of those specified as producing a ureide, one at least of which alkyls has more than one carbon atom. Each of the ureides claimed is soluble in hot water and hot alcohol, is insoluble in cold potassium or sodium hydrate solution, and is decomposable by hydrochloric acid at 100° centigrade into urea and a diakyl-acetic acid.

We are aware that besides the variations and modifications of process already indicated above others are possible, as well in the method of manipulation and the employment of proportions of reagents as also in the use of equivalents for the condensing agents already named, without changing the spirit and essential nature of our invention.

We are aware that the general formula specified in claim 1 may represent other examples of the group of substances than those specifically described heretofore. We have included under the term "dialkyl" the diethyl, dipropyl, and methyl ethyl radicals, and it will be obvious that the two alkyls may be the same or different.

We claim—

1. As a new composition of matter, a dialkyl-acetyl urea having the general formula $$(Alk)_2=CH.CO.NH.CO.NH_2,$$

wherein "$(Alk)_2$" represents two organic radicals, one at least of which has more than one carbon atom, said composition of matter being soluble in hot water and hot alcohol, insoluble in cold potassium or sodium hydrate solution, and decomposable by hydrochloric acid at 100° centigrade into urea and a dialkyl-acetic acid.

2. Diethyl-acetyl urea having the formula $C_7H_{14}N_2O_2$, which crystallizes from hot water in the form of fine needles, melting at about 207° centigrade, and which is soluble in about one hundred and twenty parts of hot water, more freely soluble in hot alcohol, and which is decomposable by hydrochloric acid at 100° centigrade into urea and diethyl-acetic acid.

3. The process of preparing a ureide of a dialkyl-acetic acid, which consists in acting on urea and a dialkyl-malonic acid (at least one of the alkyls of which acid has more than one carbon atom) simultaneously by a suitable condensing agent, which at least splits off water; and subsequently, if needed, applying heat to split off carbon dioxid also and thus isolate the desired new product.

4. The process of preparing a ureide of a dialkyl-acetic acid, which consists in condensing urea and a dialkyl-malonic acid (at least one of the alkyls of which acid has more than one carbon atom) into a new product by acting on them simultaneously by a suitable acid chlorid, so as to split off water and carbon dioxid.

5. The process of preparing a ureide of a dialkyl-acetic acid, which consists in condensing urea and a dialkyl-malonic acid (at least one of the alkyls of which acid has more than one carbon atom) into a new product by acting on them simultaneously by a suitable acid chlorid, so as to split off water and carbon dioxid, and then isolating the condensation product thus obtained.

6. The process of preparing a ureide of a dialkyl-acetic acid, which consists in condensing urea and a dialkyl-malonic acid (at least one of the alkyls of which acid has more than one carbon atom) into a new product by acting on them simultaneously by fuming sulfuric acid; so as to split off water, with possibly some carbon dioxid; isolating the condensation product, and splitting off carbon dioxid therefrom through the application of heat.

7. The process of preparing a ureide of a dialkyl-acetic acid (that is, preparing a dialkyl-acetyl urea), which consists in bringing about condensation between urea and a dialkyl-malonic acid (at least one of the alkyls of which acid has more than one carbon atom) by a suitable condensing agent, so as to split off water and carbon dioxid therefrom.

8. The process of preparing a ureide of a dialkyl-acetic acid (that is, preparing a dialkyl-acetyl urea), which consists in bringing about condensation between urea and a dialkyl-malonic acid (at least one of the alkyls of which acid has more than one carbon atom) by a suitable condensing agent, so as to split off water and carbon dioxid therefrom, and then purifying the product of such condensation.

9. The process of preparing a diethyl-acetyl urea, which consists in bringing about condensation between urea and a diethyl-malonic acid by a suitable condensing agent, so as to split off water and carbon dioxid therefrom.

Signed at Berlin, Germany, this 21st day of February, 1903.

EMIL FISCHER.
JOSEF VON MERING.

Witnesses:
HENRY HASPER,
WOLDEMAR HAUPT.